June 10, 1952     G. H. ACKER     2,600,178
LUBRICATING MECHANISM

Filed July 31, 1946     5 Sheets—Sheet 1

INVENTOR.
GEORGE H. ACKER
BY
Oberlin & Limbach
ATTORNEYS

INVENTOR.
GEORGE H. ACKER
BY
Oberlin + Limbach
ATTORNEYS

INVENTOR.
GEORGE H. ACKER
BY
Oberlin & Limbach
ATTORNEYS

June 10, 1952 G. H. ACKER 2,600,178
LUBRICATING MECHANISM
Filed July 31, 1946 5 Sheets-Sheet 4

INVENTOR.
GEORGE H. ACKER
BY
Oberlin & Limbach
ATTORNEYS

June 10, 1952 — G. H. ACKER — 2,600,178
LUBRICATING MECHANISM
Filed July 31, 1946 — 5 Sheets-Sheet 5

INVENTOR.
GEORGE H. ACKER
BY
Oberlin + Limbach
ATTORNEYS

Patented June 10, 1952

2,600,178

UNITED STATES PATENT OFFICE 2,600,178

LUBRICATING MECHANISM

George H. Acker, Shaker Heights, Ohio, assignor to The Farval Corporation, Cleveland, Ohio, a corporation of Ohio Application July 31, 1946, Serial No. 687,474

12 Claims. (Cl. 184—7)

This invention relates as indicated to lubricating mechanism and more particularly to a device for supplying lubricant under pressure to a lubricating system.

Various types of lubricating systems are now in use for supplying lubricants such as grease or oil to bearings of many types of machinery such as mill stands, tables and coilers of hot strip mills, shears and punches, and the like. An example of a special measuring valve adapted to be employed in such systems to dispense desired amounts of lubricant to the bearing is disclosed in U. S. Patent No. 2,016,372 to Aaron J. Jennings. In a system employing valves of this type, two parallel lubricant supply lines are provided together with a pump designed alternately to supply lubricant under pressure to each of such lines. The lubricant dispensing valves of the type above referred to will force a desired amount of lubricant into the bearing each time one of such lines is put under pressure.

With certain types of machines and bearings, such lubricant dispensing valves need be operated only at relatively long intervals. It is, however, desired that such operation be both automatic and regular. Such long interval between lubricating cycles may be accomplished by minimizing the size of the lubricant pump and operating such pump at a greatly reduced speed so as to produce a pump delivery rate low enough to provide a long time cycle. Since, however, in any lubricating system there are many small points of leakage, of highly variable total magnitude, it is very difficult, if not impossible, to engineer the lubricating system properly taking into account and allowing for such rate of leakage. When the pump output is thus lowered, the unpredictable compressibility resulting from air which may be entrapped in the lubricating system also becomes a factor of importance interferring with positive operation of the mechanism. It is, of course, very important that positive lubrication of all of the bearings in the system be assured since failure of proper lubrication may mean serious damage to the machinery and costly shut-downs for repairs.

It is, therefore, a primary object of my invention to provide a lubricating mechanism which may be caused to provide long intervals between lubricating cycles but which will be positive and automotive in operation.

Another object of my invention is to provide such mechanism which will be adjustable without the additional complication of electric timers, electric motors, reduction gearing and the like.

A further object of my invention is to provide such mechanism in which the pump may operate continuously at any desired setting of the lubricating cycle.

Other objects of my invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
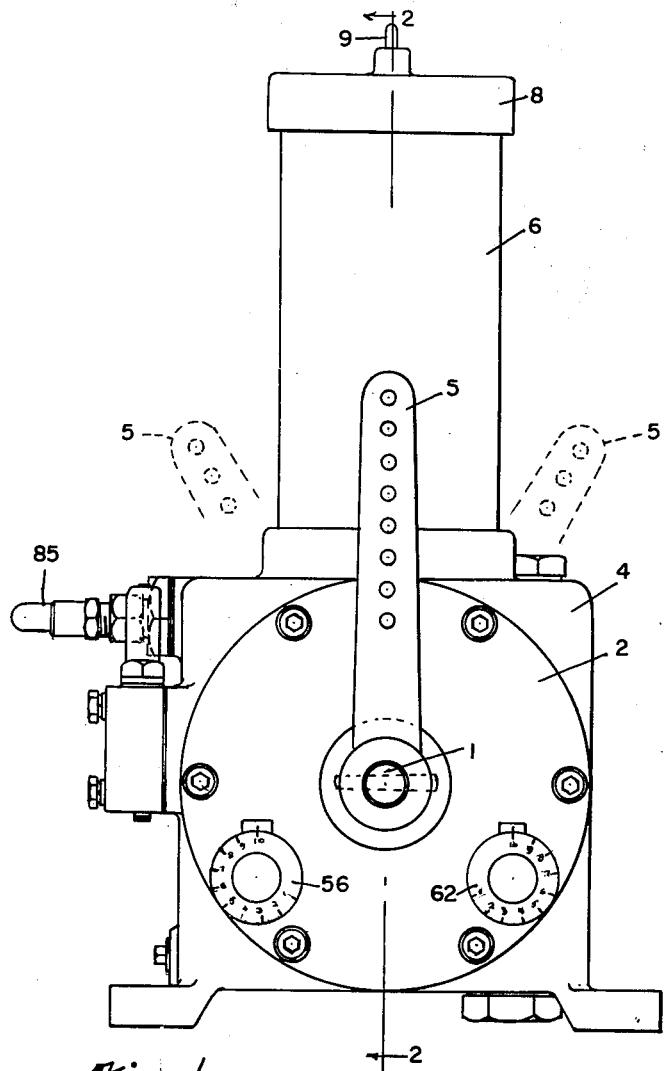
Fig. 1 is an end elevational view of my new mechanism including the pump and associated regulatory means.
Figure 2:
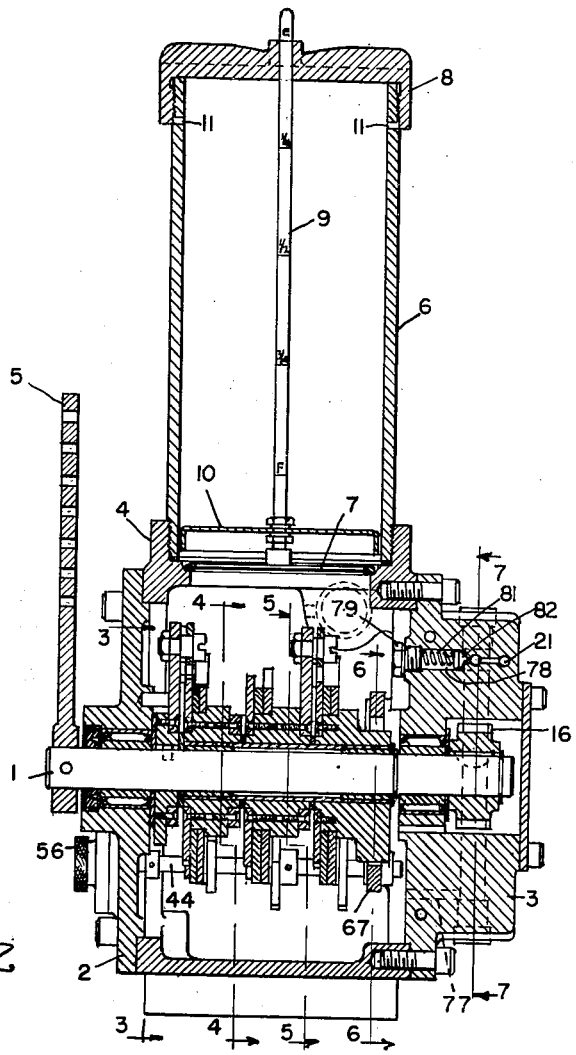
Fig. 2 is a vertical sectional view taken along the line 2—2 on Fig. 1.

Referring now more particularly to such drawings and especially Figs. 1 and 2 thereof, a rocker shaft 1 is journalled in needle bearings in end plate 2 and end member 3 of pump housing 4. A rocker arm 5 is pinned to the end of such shaft, such arm being adapted to be driven by an eccentric or its equivalent on the machine being served whereby such rocker shaft 1 may be oscillated 60° about its axis as indicated in dash line on Fig. 1. A lubricant tank or container 6 is supported on such housing 4 in communication with the interior of such housing. A fine mesh wire screen 7 is interposed between such tank and the interior of the housing to filter out any dirt particles which may be contained in the lubricant. Tank 6 is closed by a cover 8 through which protrudes an indicator rod 9 carried by a follower plate 10. Safety vents 11 are provided adjacent the top of such tank or container to eliminate the possibility of excessive pressure being applied due to overfilling. It will thus be seen that container 6 together with the chamber formed by housing 4 provide a lubricant reservoir for the pump.

Figure 9:
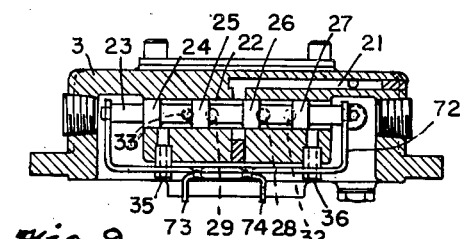
Fig. 9 is a sectional view taken along the line 9—9 on Fig. 7 and also along line 9—9 on Fig. 8.
Figure 7:
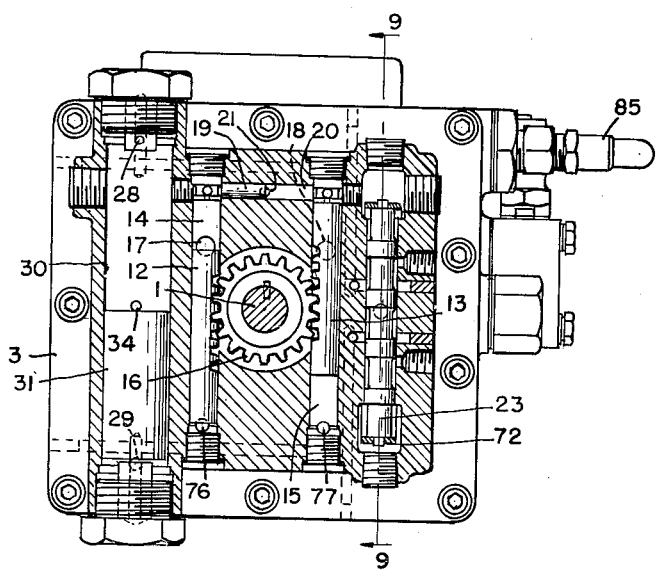
Fig. 7 is a vertical sectional view taken along the line 7—7 on Fig. 2.

Referring now more especially to Fig. 7 a double piston single acting pump is provided comprising two pistons 12 and 13 respectively reciprocable in cylinders 14 and 15 by pinion 16 keyed to rocker shaft 1. Such cylinders 14 and 15 communicate with the grease filled interior of the housing 4 through inlet passages 17 and 18 respectively, forming inlet valves as such pistons are reciprocated. As either piston closes its inlet valve on the compression stroke, it causes shuttle piston 19, operating in cross bore 20 connecting the two cylinders, to be displaced toward the other cylinder thereby connecting the cylinder under pressure with discharge passage 21. Such discharge passage connects with the mid part of cylinder 22 of a flow shifter valve formed by a sliding spool 23 in such cylinder, such spool having four shoulders 24, 25, 26 and 27 (see Figs. 9 and 10). Passages 76 and 77 at the other end of such cylinders 14 and 15, respectively, communicate with the reservoir to permit movement of such pistons without formation of a vacuum behind the same.

By shifting spool 23 of such flow shifter valve, pump discharge passage 21 may be connected with either port 28 or 29 leading to the respective ends of serving cylinder 30 (see Fig. 7). It will, therefore, be seen that by thus shifting the spool of such flow shifter valve, piston 31 in serving cylinder 30 may be reciprocated to force lubricant out through whichever passage 28 or 29 is not connected with pump discharge passage 21. As best shown in diagrammatic Fig. 10, if passage 29 be thus connected with pump discharge passage 21, then passage 28 will be connected with supply line 32, whereas when the position of such flow shifter valve is reversed, pump discharge passage 21 will be connected with passage 28 leading to serving cylinder 30 and passage 29 will be connected with the other supply line 33. When serving cylinder piston 31 has been moved the length of cylinder 30, it opens passage 34 leading to the reservoir, thereby relieving the pumping system. Cylinder 22 of the flow shifter valve is likewise vented to the reservoir through drilled pins 35 and 36 to relieve the supply line (32 or 33) not then receiving lubricant from serving cylinder 30.

It will thus be seen that the frequency of the lubricating cycle will depend upon the frequency with which flow shifter valve formed by cylinder 22 and spool 23 is shifted. Means is provided for mechanically adjusting the timing of the operation of such flow shifter valve. Such means comprises three sets of pawl and ratchet devices carried by rocker shaft 1 and arranged in series. At the driving end of the rocker shaft just inside end plate 2, there is keyed to such shaft a member 37 carrying a pawl arm 38 held down by spring 39. A roller 40 on the end of such pawl arm is adapted to ride on the conjoint contours of two plate cams 41 and 42. Cam 41 is prevented from rotation about shaft 1 by means of a fork 43 fastened thereto and engaging control shaft 44 (see Fig. 3). The position of plate cam 42 relative to cam 41 may be adjusted at assembly and will thereafter remain fixed. Reversal of the ratchet is prevented by a restraining spring 45 embracing the ratchet, and anchored against rotative movement by the pin 95 projecting from plate cam 42, and engaging the teeth of the ratchet 46 at one extremity. It will be seen from the foregoing that as shaft 1 is rocked, thereby likewise rocking member 37 with attached pawl 38, such pawl will engage the teeth of ratchet 46 and drive such ratchet about shaft 1. The extent of rotation of ratchet 46 for each time that shaft 1 is rocked will depend upon the relative positions of plate cams 41 and 42 which determine the number of ratchet teeth exposed for engagement with pawl 38, roller 40 riding on the peripheries of such cams and thereby holding the pawl out of engagement with the ratchet except for such exposed portion.

Figures 3, 4, 5:
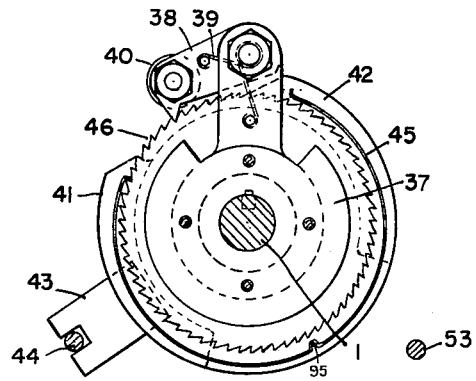
Fig. 3 is a view of a portion of the timing mechanism taken along the line 3—3 on Fig. 2.
Fig. 4 is a portion of such timing mechanism taken along the line 4—4 on Fig. 2.
Fig. 5 is a portion of such timing mechanism taken along the line 5—5 on Fig. 2.

Ratchet 46 is secured to a hub 47 carrying a second and similar pawl arm 48, the whole being mounted for rotation about shaft 1 (see Fig. 4). Since ratchet 46 is driven intermittently in one direction only, pawl arm 48 will likewise be driven at this reduced rate in one direction around the rocker shaft and a second pair of cam plates 49 and 50 permit engagement of pawl 48 with ratchet 51 over a limited span of ratchet teeth. Cam 50 is prevented from rotation by means of fork 52 fastened thereto and engaging control shaft 53. Cam 49, on the other hand, is provided with a segmental gear 54 engaging pinion 55 keyed to control shaft 44 so that the position of cam 49 relative to cam 50 may be regulated by setting control knob 56 attached to the end of such shaft.

Such second ratchet 51 is secured into assembly with hub 57 likewise mounted for rotation on shaft 1 and carrying a pawl arm 58 (see Fig. 5). Plate cams 59 and 60 are relatively adjustable in the same manner as cam 49 and 50 except that cam 59 is secured against rotation by means of fork 61 engaging control shaft 44 while cam 60 may be adjusted by turning knob 62 and thereby shaft 53, pinion 63 keyed thereto, and gear segment 64 attached to such cam 60.

Figure 8:
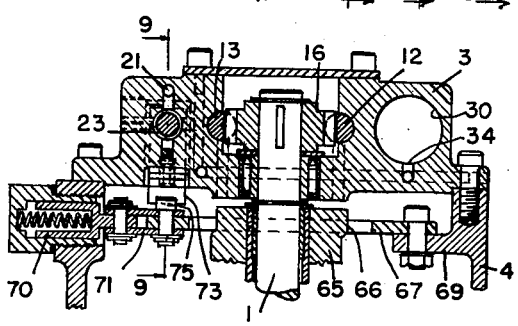
Fig. 8 is a horizontal sectional view taken along the line 8—8 on Fig. 6.
Figure 6:
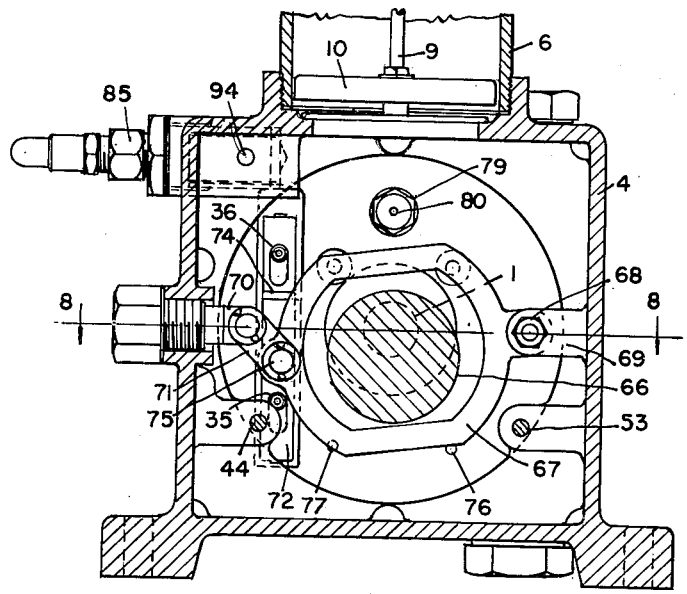
Fig. 6 is a vertical sectional view taken along the line 6—6 on Fig. 2.

Rotation of member 57 carrying pawl 58 is thus effective to rotate ratchet 65 at a much reduced rate about rocker shaft 1. Such ratchet 65 is integral with eccentric 66 (see Figs. 6 and 8) turning within a yoke 67 pivotally attached at 68 to a boss 69 on casing 4. A spring backed plunger 70 is pivotally connected to such yoke by link 71 whereby such yoke is held off center, one way or the other, until the turning of eccentric 66 forces the yoke past center in the opposite direction. Spring backed plunger 70 will thereupon cause the yoke to snap to its other extreme position.

Spool 23 of the flow shifting valve (see Fig. 9) is provided with a bridge 72 carrying two projecting fingers 73 and 74. Such fingers are alternately engaged by a projection at 75 on yoke 67 when such yoke is snapped back and forth by the rotation of eccentric 66. Sufficient spacing is provided between such fingers 73 and 74 that bridge 72 and valve spool 23 will not be shifted by the yoke 67 until the yoke has passed its center position, and is being rapidly driven by the spring plunger 70 to one extreme position or the other.

From the foregoing, it will be seen that I have provided adjustable timing mechanism whereby lubricant from the pump discharge may be alternately directed into one or the other of the lubricant supply lines 32 and 33 at predetermined intervals.

It is contemplated that the pump of this invention will ordinarily be operated at between 50 and 250 cycles per minute, 100 cycles being a normal speed. By adjusting knobs 56 and 62 of the timing mechanism it is possible, in one mechanism constructed in accordance with my invention, to obtain a reversal of the flow shifting valve after a minimum of 216 cycles operation, or every 2.16 minutes at 100 cycles per minute. The same mechanism may be adjusted to reverse such flow shifting valve only every 21,600 cycles, or every 216 minutes, operating at 100 cycles per minute. Despite such long interval, at the expiration of each period, proper lubrication is assured since serving cylinder 30 will positively force sufficient lubricant into the supply line at a rate of flow determined for optimum operation of the lubricating valves connected to said supply line, and independent of the time cycle upon which the device happens to be operating. The pump, of course, has ample capacity and operates at sufficient speed to properly reciprocate piston 31 in such cylinder 30.

A pressure relief valve or safety valve is provided for pump discharge line 21 (see Figs. 2 and 6) comprising a passage 78 connecting line 21 and the reservoir. A plug 79 having an opening 80 therein is threaded in the reservoir end of such passage and retains compression spring 81 which backs valve-head 82, keeping the latter firmly seated except when through some mischance excessive pressure is generated in line 21.

Figure 10:
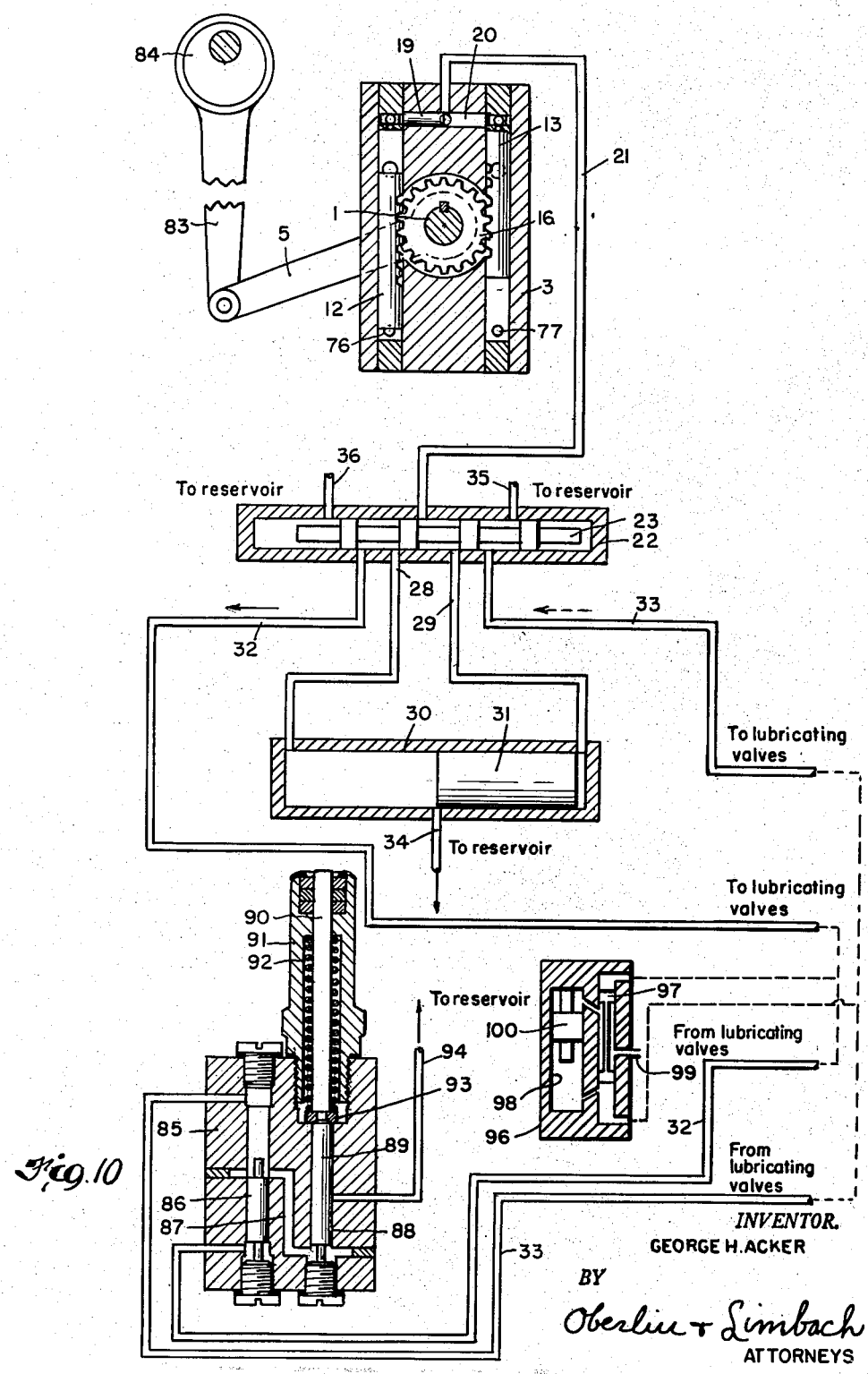
Fig. 10 is a diagrammatic layout of a lubricating system of the type adapted to be employed in conjunction with my new mechanism.

The operation of the above-described mechanism will be best understood from a consideration of diagrammatic Fig. 10. The rocker arm 5 is there shown operated by driver 83 and eccentric 84 which may be rotatively connected to the machine, the bearings of which are to be lubricated. In the position in which spool 23 of the flow shifter valve is illustrated, lubricant from pump discharge line 21 will be directed into the right-hand end of serving cylinder 30. This will move piston 31 to the left, forcing lubricant into passage 28 and supply line 32. Such lubricant under pressure in line 32 will operate the series of lubricant measuring valves serving the bearings. A typical lubricant measuring valve 96 is shown connected across lines 32 and 33 but it will be appreciated that any desired number of such valves may be thus installed. Pressure in one such line serves first to reciprocate valve piston 97 to connect the opposite end of cylinder 98 to the outlet 99 and then to reciprocate piston 100 in such cylinder to expel a measured charge to the bearing or other part being serviced. When the pressure in the lines is next reversed such two pistons will now be sequentially reciprocated in the opposite direction. Various other forms of lubricant dispensing valves similarly operable when connected across two alternating pressure lines are well known in the art. To ensure proper servicing of the bearings, an excess of lubricant will have been forced into line 32. To provide for return of such excess, as well as to indicate visibly that the system has been completely serviced, a pressure control valve 85 is mounted on casing 4 where both supply lines 32 and 33 return to the reservoir. A shuttle piston 86 in such valve will be reciprocated to connect either supply line 32 or 33, depending on which is under pressure, with passage 87. Such passage communicates with the end of cylinder 88 in which piston 89 reciprocates. Such piston bears, at its upper end, against the rod 90, which projects through an opening in housing 91. A compression spring 92 within such housing and around such rod bears on a shoulder 93 of rod 90, to hold said rod and piston 89 normally depressed. Fluid pressure in passage 87 will tend to move piston 89 against the pressure of spring 92 until such piston has been pushed back to the opening of passage 94 in cylinder 88 which communicates with the reservoir. By employing springs of different compressibility it is possible to regulate the amount of pressure which can be built up in the supply lines before relief passage 94 will be opened. Rod 90 serves as an indicator rod, visually demonstrating that the volumetric lubricant requirements of the valves at the bearings have been met, and that a sufficient surplus has been applied to the system to establish the desired operating pressure.

Instead of employing the oscillating driving means illustrated the mechanism may be adapted for a rotary drive, a gear type or conventional single piston pump being substituted for the double piston pump shown. It will be understood, of course, that the pump is continuously operating, with the mechanically timed flow shifter connecting such pump at adjustably predetermined time intervals alternately to each of the two supply lines while the other line is in relief to the reservoir. The one serving cylinder meters lubricant to each of these supply lines, such cylinder having a capacity more than adequate to serve the whole connected lubricating system. When this cylinder has been discharged it automatically relieves the internal system pressure, thereby permitting continuous operation of a relatively large capacity pump. Normal leakages in the system can thus be ignored. Each time pressure is applied to the external lubricating valve system it is supported by a fairly high pumping rate and the operation of such external system is quickly accomplished, minimizing leakage in that system, all irrespective of the length of the time cycle between operations.

From the foregoing it will be seen that a lubricating mechanism having desired characteristics has been provided, and particularly such mechanism capable of efficient operation whether the time cycle be long or short.

While, as indicated, the present improved apparatus is primarily designed for the handling of lubricants, by which term it is intended to include soft greases which are sometimes referred to as "non-fluid" lubricants, it will be understood that such mechanism is not limited to such use but may be employed generally in the handling of any liquid or fluid material capable of being handled by pumping mechanism such as shown and described. Accordingly, the term "lubricant" as used herein is intended to connote any such liquid or fluid.

Other modes of applying the principle of the invention may be employed, change being made as regards the details described, provided the features stated in any of the following claims or the equivalent of such be employed.

I therefore particularly point out and distinctly claim as my invention:

1. In combination, two lubricant supply lines, a pump adapted to supply lubricant to such lines under pressure, means adapted to operate said pump continuously, means adapted intermittently to meter the discharge of said pump alternately to each of said lines, means adapted to connect the line not receiving lubricant to relief, means adapted to regulate the pressure in the line to which lubricant is supplied, and means adapted to direct the discharge of said pump to relief operative when said metering means is not supplying lubricant to either of said lines.

2. In combination, a continuously operating pump adapted to supply lubricant under pressure, a metering device comprising a double-acting piston-cylinder assembly, valve means adapted intermittently to direct the discharge of said pump alternately to each end of such cylinder, two lubricant pressure supply lines respectively connected to opposite ends of such cylinder, valve means operative in synchronism with said first-named valve means to close the supply line at the end of such cylinder receiving the discharge of said pump, and valve means controlled by reciprocation of such piston adapted to direct the discharge of said pump freely to relief operative when lubricant pressure in such cylinder has completely reciprocated such piston and before said first-named valve means has directed the discharge of the pump to the other end of such cylinder.

3. In combination; a continuously operating pump adapted to supply lubricant under pressure; a metering device comprising a cylinder, a piston reciprocable in said cylinder, and an outlet to relief from the midpoint of said cylinder adapted to be uncovered when said piston has been completely reciprocated; valve means adapted to direct the discharge of said pump alternately to each end of said cylinder; means automatically operative thus to shift said valve means at predetermined intervals; two lubricant pressure supply lines adapted to be respectively connected to opposite ends of said cylinder; and valve means operative in synchronism with said first-named valve means to close the supply line at the end of said cylinder receiving the discharge from said pump and to open the other supply line to said cylinder at the other end of said cylinder.

4. In mechanism of the character described, a rotatable shaft, a pump driven by said shaft, two supply lines, means adapted to meter the discharge of said pump alternately to each of said lines, means adapted to thus reverse said metering means comprising a series of pawls and ratchets driven by said shaft, and means operative to adjust the timing of such reversal comprising cam means adjustable to variably limit the portions of such ratchets engageable by such pawls.

5. In mechanism of the character described, a rotatable shaft, a pump driven by said shaft, two supply lines, means adapted to meter the discharge of said pump alternately to each of said lines, a flow shifter valve operative to thus reverse said metering means, means adapted to shift said valve at predetermined intervals comprising a series of pawls and ratchets driven by said shaft, and means operative to determine the length of such interval comprising cam means adjustable to variably limit the portions of such ratchets engageable by such pawls.

6. In mechanism of the character described, a shaft, means operative to oscillate said shaft about its longitudinal axis, a reciprocating pump driven by said oscillating shaft, two supply lines, means adapted to meter the discharge of said pump alternately to each of said lines, means adapted intermittently to operate said metering means at predetermined intervals comprising a series of pawls and ratchets, means connecting the first of such pawls in driven engagement with said shaft, each of such ratchets driving the next succeeding pawl, and means operative to determine the length of such intervals comprising cam means adjustable to variably limit the portions if such ratchets engageable by such pawls.

7. In mechanism of the character described including a shaft, a pump driven by said shaft, two lines, and a valve operative to direct the discharge of said pump alternately to each of said lines; volumetric metering means interposed between said pump and said lines effective to determine the exact volume delivered to each said line, and timing means adjustably adapted to shift said valve at predetermined intervals thus to direct such pump discharge comprising a series of pawls and ratchets, means connecting the first of such series of pawls and ratchets in driven engagement with said shaft, each member of such series driving the next succeeding member thereof, and means operative to determine the length of such intervals comprising means adjustable variably to limit the portions of such ratchets engaged by said pawls.

8. In a fluid pressure system comprising a pump operative continuously to discharge a fluid under pressure and two lines adapted to receive such fluid therefrom, at least one such line being a pressure line; metering means automatically operative to meter such continuous discharge of such pump alternately to such lines, means operative to connect the line not receiving lubricant to relief, and means adapted to direct the discharge of such pump to relief automatically operative whenever said metering means is not delivering fluid to at least one such line.

9. In a lubricating system comprising a pump operative continuously to discharge a lubricant under pressure drawn from a reservoir thereof, and two lines adapted to receive such discharge, at least one such line being a pressure line; metering means automatically operative intermittently to meter a predetermined volume of the discharge of such pump alternately to such lines, means adapted to regulate the pressure in such pressure line to which lubricant is supplied and to connect such line to reservoir when a predetermined pressure is exceeded, and means adapted to direct the discharge of such pump to reservoir automatically operative whenever said metering means is not delivering fluid to at least one such line.

10. In a lubricating system comprising a pump operative continuously to discharge lubricant under pressure, and two pressure lines adapted to receive such discharge; metering means adapted intermittently to meter a predetermined volume of the discharge of such pump alternately to such lines, means adapted to regulate the pressure in such lines to which lubricant is supplied and to connect such lines to relief when a predetermined pressure is exceeded, means adapted to connect a line not receiving lubricant to relief, and means adapted to direct the discharge of such pump to relief automatically operative whenever said metering means is not delivering lubricant to at least one such line.

11. In a lubricating system comprising a pump operative continuously to discharge lubricant under pressure, and two pressure lines adapted to receive such discharge and deliver the same to lubricant dispensing devices; a serving cylinder having a piston reciprocable therein, a line leading from each end of said cylinder, a flow shifter valve adapted to receive such continuous discharge of such pump and deliver the same alternately to said lines leading to the respective ends of said cylinder, said flow shifter valve being operative simultaneously to connect one of such pressure lines with the line leading from the end of said cylinder not thus receiving such pump discharge and to connect the other such pressure line to relief, means adapted to regulate the pressure in such pressure line to which lubricant is thus supplied and to connect such line to relief when a predetermined pressure is exceeded, and a port leading from said serving cylinder adapted to be uncovered by shifting of said piston to direct further lubricant received from said flow shifter valve to relief until said valve is again shifted to deliver such lubricant to the line leading to the other end of said cylinder and said piston is thereupon shifted in the other direction.

12. In a fluid supply system, a reservoir, two conduits adapted alternately to serve one as a feed line and the other as a return line for lubricating devices, continuously operable pressure means adapted to supply fluid from said reservoir to said conduits, metering means adapted intermittently to meter such fluid supply alternately to said conduits, means adapted simultaneously to connect the conduit not thus receiving fluid under pressure to the reservoir, pressure regulating means operative to release fluid from said conduit under pressure to the reservoir when a predetermined pressure is exceeded, and valve means actuated with said metering means adapted to connect such fluid supply from said pressure means freely to reservoir automatically operative when said metering means is not supplying fluid to either of said conduits.

GEORGE H. ACKER.

REFERENCES CITED

The following references are of record in the file of this patent:

UNITED STATES PATENTS

| Number | Name | Date |
|---|---|---|
| 1,465,258 | French | Aug. 21, 1923 |
| 1,905,179 | Locke | Apr. 25, 1933 |
| 1,914,900 | Tarbox | June 20, 1933 |
| 1,979,370 | Davis | Nov. 6, 1934 |
| 2,029,198 | Ross | Jan. 28, 1936 |
| 2,063,903 | Bijur | Dec. 15, 1936 |
| 2,068,391 | Acker | Jan. 19, 1937 |
| 2,219,681 | Davis | Oct. 29, 1940 |
| 2,232,620 | Meeks | Feb. 18, 1941 |
| 2,406,239 | Morgenroth | Aug. 20, 1946 |